(12) United States Patent
Lee

(10) Patent No.: US 7,650,441 B2
(45) Date of Patent: Jan. 19, 2010

(54) ELECTRONIC APPARATUS WITH DEVICE CAPABLE OF SIMULTANEOUSLY READING AND WRITING AND METHOD THEREOF

(75) Inventor: Hyung-jin Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 102 days.

(21) Appl. No.: 11/699,346

(22) Filed: Jan. 30, 2007

(65) Prior Publication Data

US 2008/0126638 A1    May 29, 2008

(30) Foreign Application Priority Data

Sep. 8, 2006    (KR)    ............... 10-2006-0086564

(51) Int. Cl.
*G06F 3/00*    (2006.01)
(52) U.S. Cl. ............................... 710/30; 710/5
(58) Field of Classification Search ...................... None
See application file for complete search history.

(56) References Cited

U.S. PATENT DOCUMENTS

| | | | | |
|---|---|---|---|---|
| 5,151,999 | A * | 9/1992 | Marzucco et al. | 710/22 |
| 6,230,311 | B1 * | 5/2001 | Gerard et al. | 717/108 |
| 2002/0120795 | A1 * | 8/2002 | Charlier | 710/33 |
| 2006/0028564 | A1 * | 2/2006 | Baer | 348/294 |
| 2006/0095596 | A1 * | 5/2006 | Yung et al. | 710/5 |

* cited by examiner

*Primary Examiner*—Eron J Sorrell
(74) *Attorney, Agent, or Firm*—Stanzione & Kim, LLP

(57) ABSTRACT

An electronic apparatus including a device capable of simultaneously reading and writing, and a method thereof. The present electronic apparatus includes a first device to generate and output a Command containing a Read_Start_Address, a Write_Start_Address, and Write_Data in a header, and a second device to receive the Command to enable data to be recorded. Therefore, it is possible to reduce the time required to communicate data between devices.

19 Claims, 3 Drawing Sheets

ELECTRONIC APPARATUS WITH DEVICE CAPABLE OF SIMULTANEOUSLY READING AND WRITING AND METHOD THEREOF

CROSS-REFERENCE TO RELATED APPLICATIONS

This application claims the benefit under 35 U.S.C. § 119(a) of Korean Patent Application No. 10-2006-0086564, filed on Sep. 8, 2006, in the Korean Intellectual Property Office, the entire disclosure of which is hereby incorporated in its entirety by reference.

BACKGROUND OF THE INVENTION

1. Field of the Invention

The present general inventive concept relates to an electronic apparatus and a method thereof. More particularly, the present general inventive concept relates to an electronic apparatus including a device capable of simultaneously reading and writing, and a method thereof.

2. Description of the Related Art

A serial peripheral interface (hereinafter, referred to as "SPI") is an interface that enables a serial exchange of data between two peripheral devices, one called a master and the other called a slave. Additionally, an SPI operates so that data can be transferred in both directions.

However, even though data is transferred in both directions, it is impossible to simultaneously read and write data in both a master and a slave. This is because information transmitted from a master to a slave comprises only a "Read_Address" or a "Write_Address".

Therefore, it is difficult to process data within a short time since a master and a slave cannot simultaneously read and write data, even though data is transmitted between a master and a slave in both directions.

SUMMARY OF THE INVENTION

The present general inventive concept provides an electronic apparatus and a method thereof, which includes a device capable of simultaneously performing reading and writing to reduce data communication time.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may also be achieved by providing an electronic apparatus including a first device to generate and output a Command containing a Read_Start_Address, a Write_Start_Address, and Write_Data in a header, and a second device to receive the Command to enable data to be recorded.

The first device may receive Read_Data from the second device while the Command is being transmitted to the second device.

Additionally, the second device may transmit Read_Data to the first device while the Command is being received from the first device.

The first and second devices may be connected through a Serial Peripheral Interface (SPI), and the first device may operate as a master and the second device may operate as a slave.

If the Write_Data includes a plurality of bytes, a Write_Data1 corresponding to one byte of data transmitted first to the first device may be recorded in the Write_Start_Address.

Data other than the Write_Data1 may be recorded byte by byte in addresses subsequent to the Write_Start_Address according to the transmission order.

The foregoing and/or other aspects and utilities of the present general inventive concept may also be achieved by providing a method of controlling an electronic apparatus including a first device and a second device may be provided, which includes generating a Command containing a Read_Start_Address, a Write_Start_Address, and Write_Data in a header on the first device, and transmitting the Command from the first device to the second device.

The first device may receive Read_Data from the second device while the Command is being transmitted to the second device.

Additionally, the second device may transmit Read_Data to the first device while the Command is being received from the first device.

The first and second devices are connected through a Serial Peripheral Interface (SPI), and the first device may operate as a master and the second device may operate as a slave.

If the Write_Data includes a plurality of bytes, a Write_Data1 corresponding to one byte of data transmitted first to the first device may be recorded in the Write_Start_Address.

Data other than the Write_Data1 may be recorded byte by byte in addresses subsequent to the Write_Start_Address according to the transmission order.

The foregoing and/or other aspects and utilities of the present general inventive concept may also be achieved by providing an electronic apparatus, including a slave to sequentially read data from a read start address and to transmit the read data in a bitwise manner, a master to generate a clock signal, to receive the read data from the slave and to transmit write data to the slave which records the write data sequentially from a write start address, wherein the master transmits the write data and receives the read data simultaneously.

The transmitting of the read data and the receiving of the write data may occur at a rising edge of the clock signal.

The transmitting of the write data may include a header which contains a write flag, a read flag, the write start address, and the read start address.

The reading and transmitting of the read data may correspond to the read flag, and the transmitting and recording of the write data corresponds to the write flag.

The slave may simultaneously read and transmit the read data to the master while receiving and recording the write data when the values of the write flag, the write start address, the read flag, and the read start address are determined.

The foregoing and/or other aspects and utilities of the present general inventive concept may also be achieved by providing an electronic apparatus, including a master to generate a clock signal and to generate a command including write data and a header which includes a write flag, a write start address, a read flag, and a read start address, and a slave to simultaneously read and transmit read data to the master while receiving and recording the write data from the master when the slave detects the values of the write flag, the write start address, the read flag, and the read start address.

The foregoing and/or other aspects and utilities of the present general inventive concept may also be achieved by providing a method of controlling an electronic apparatus including generating a clock signal at the first device, sequentially reading data from a read start address at the second device, transmitting the read data in a bitwise manner to the first device, and simultaneously receiving the read data at the first device and transmitting write data from the first device to the second device which records the write data sequentially from a write start address.

The transmitting of the read data and the receiving of the write data may occur at a rising edge of the clock signal.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
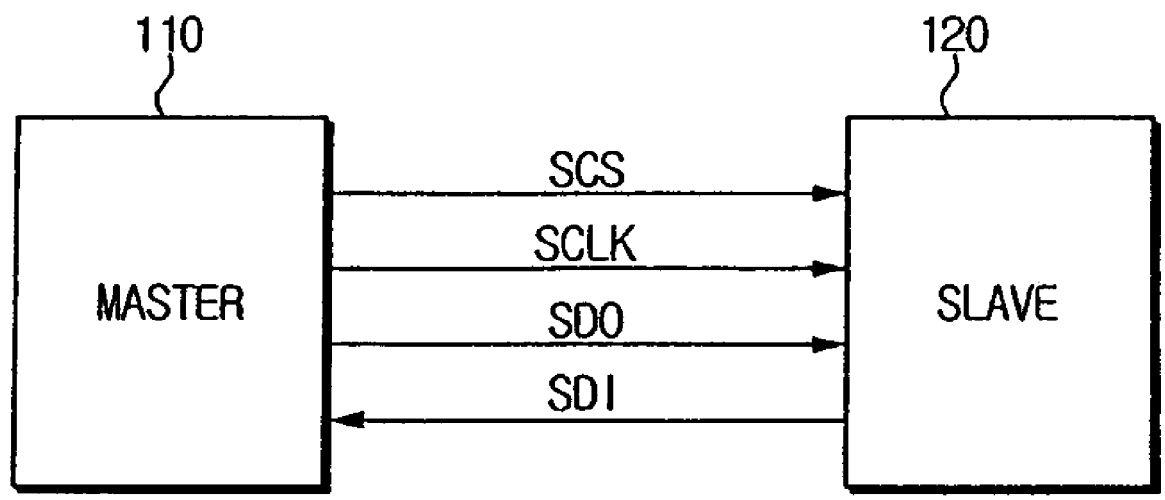
FIG. 1 is a block diagram of an electronic apparatus including a master and a slave according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an electronic apparatus including a master 110 and a slave 120 according to an exemplary embodiment of the present general inventive concept.

The master 110 generates and transmits a chip select signal, a clock signal and a command signal to the slave 120, and receives a data from the slave 120.

The master 110 first generates and transmits a Serial_Chip_Select (SCS) to the slave 120. The SCS may be a 'high' logical level or a 'low' logical level. Specifically, if the master 110 generates and transmits an SCS that has a 'high' logical level to the slave 120, data is not communicated between the master 110 and the slave 120 during a 'high' logical level period.

In contrast, if the master 110 generates and transmits an SCS that has a 'low' logical level to the slave 120, data is communicated between the master 110 and the slave 120 during a 'low' logical level period. If the master 110 changes an SCS that has a 'low' logical level to an SCS that has a 'high' logical level during data communication between the master 110 and the slave 120, and transmits the SCS to the slave 120, only the data transmitted between the master 110 and the slave 120 prior to the change to the 'high' logical level is valid.

Secondly, the master 110 generates and transmits a Serial Clock (SCLK), (that is, a synchronizing signal to transmit data), to the slave 120. A frequency of the SCLK may be set to 2 MHz to 2.5 MHz, and the SCLK may be used as a write clock signal or a read clock signal.

Thirdly, the master 110 transmits a Command (SDO) to the slave 120. The SDO includes a header and data, and the header contains a Write_Flag, a Write_Start_Address, a Read_Flag, and a Read_Start_Address.

The data contained in the SDO transmitted from the master 110 to the slave 120 is referred to as "Write_Data" or W_Data, and data SDI that is transmitted from the slave 120 to the master 110 is referred to as "Read_Data" or R_Data. Both the data SDI and the data contained in the SDO may include a plurality of bytes.

Figure 2:
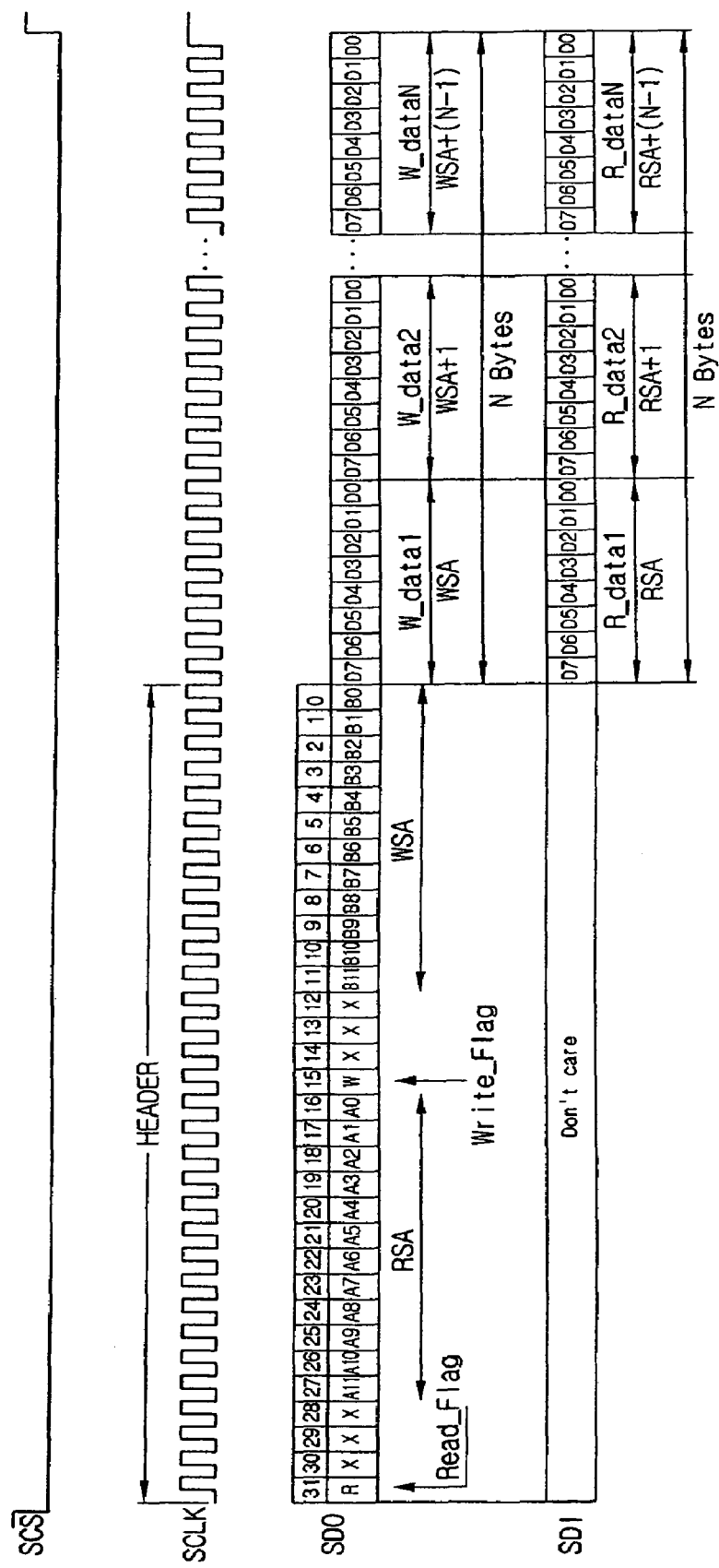
FIG. 2 is a timing diagram illustrating a master and a slave in which reading and writing are simultaneously performed.

Referring to FIGS. 1 and 2, if the W_Data includes a plurality of bytes, a Write_Start_Address (WSA) is an address of the slave 120. In the WSA, a W_Data1 is recorded corresponding to one byte of the W_Data that is transmitted first from the master 110 to the slave 120. If the R_Data includes a plurality of bytes, a Read_Start_Address (RSA) is an address of the slave 120 in which an R_Data1 corresponding to one byte of the data that is read out first to be transmitted to the master 110 is recorded.

A Flag refers to a bit that indicates whether the slave 120 operates. If a Read_Flag has a value of "1," the master 110 commands the slave 120 to read out and transmit the R_Data, and if the Read_Flag has a value of "0," the master 110 commands the slave 120 not to read out the data. In the same manner, if a "Write_Flag" has a value of "1," the master 110 commands the slave 120 to record the received data, and if the "Write_Flag" has a value of "0," the master 110 commands the slave 120 not to record the received data.

The master 110 generates and transmits the SCS that has a 'low' logical level to the slave 120, and also generates and transmits the SCLK to the slave 120. Additionally, the master 110 generates and transmits the SDO bitwise to the slave 120 on a falling edge of SCLK.

Specifically, if the master 110 transmits the SDO containing the Read_Flag which has a value of "1", the Read_Start_Address, the Write_Flag which has a value of "1," the Write_Start_Address, and the W_Data, the slave 120 that receives the SCS that has a 'low' logical level from the master 110 may receive the SCLK and the SDO that are generated and transmitted from the master 110. The slave 120 may receive the SDO on the rising edge of the SCLK.

The slave 120 receives the signal bitwise in the order in which it is transmitted from the master 110. Accordingly, the slave 120 receives in sequence the Read_Flag, Read_Start_Address, Write_Flag, Write_Start_Address, and W_Data.

Specifically, if it is determined that the Read_Flag has a value of 1, the slave 120 reads out the R_Data1 from the Read_Start_Address and transmits the R_Data to the master 110. If the SCS is maintained at a 'low' logical level, the slave 120 reads out the R_Data in an address that is subsequent to the Read_Start_Address and transmits the R_Data to the master 110. Subsequently, the slave 120 reads out in sequence the R_Data in addresses subsequent to the address that is subsequent to the Read_Start_Address. Accordingly, the slave 120 transmits the R_Data bitwise to the master 110 on the rising edge of the SCLK corresponding to change in the logical level from 'low' to 'high' in the SCS.

Additionally, if it is determined that the Write_Flag has a value of "1," the slave 120 records the W_Data, which is transmitted first, in the WSA. If the SCS is maintained at a 'low' logical level, the slave 120 records in sequence the W_Data subsequent to the W_Data1 in an address subsequent to the WSA. Accordingly, the slave 120 receives and records the W_Data on the rising edge of the SCLK corresponding to change in the logical level from 'low' to 'high' in the SCS.

In this situation, the slave 120 simultaneously transmits the R_Data and receives the W_Data. Since the header in the SDO includes a Write_Flag, a Write_Start_Address, a Read_Flag, and a Read_Start_Address, the slave 120 determines the header of the SDO, and then reads out and transmits the R_Data to the master 110 at the same time as receiving and recording the W_Data. Therefore, the master 110 transmits the W_Data and receives the R_Data simultaneously.

However, if the Write_Flag has a value of "0," the master 110 does not transmit the W_Data to the slave 120, and likewise if the Read_Flag has a value of "0," the slave 120 does not transmit the R_Data to the master 110.

FIG. 2 is a timing diagram illustrating the master 110 of FIG. 1 and the slave 120 of FIG. 1, in which reading and writing are simultaneously performed.

As illustrated in FIG. 2, the master 110 generates and applies an SCS that has a 'low' logical level to the slave 120. The master 110 also applies an SCLK to the slave 120 while generating and applying the SCS that has a 'low' logical level to the slave 120.

Additionally, the master 110 transmits the SDO to the slave 120 bitwise on the falling edge. The SDO transmitted from the master 110 to the slave 120 includes a header including 32 bits and W_Data including N bytes.

The Read_Flag, which is a signal to indicate whether reading is performed, is recorded in the most significant bit of the first byte of the header. The 15 bits that are subsequent to the first byte of the header include a Read_Start_Address (RSA) of an address in which data that will be transmitted from the slave 120 is recorded. As illustrated in FIG. 2, 12 bits may represent the address of the slave 120, and accordingly only 12 bits among the 15 bits are used as the address. The 16 bits that are subsequent to the Read_Start_Address represent the Write_Flag and the Write_Start_Address (WSA).

In addition, the SDO includes W_Data including N bytes. W_Data1 corresponding to one byte that is subsequent to the header, as a data that is transmitted first to the slave 120, is recorded in the Write_Start_Address (WSA). W_Data2 is recorded in the WSA+1, which is an address next to the WSA. Accordingly, when the W_Data increases byte by byte, the address increases sequentially.

The slave 120 determines header information of the SDO while receiving the SDO which is output from the master 110. If there is a command to perform reading and writing in the header of SDO, that is, if the Read_Flag and Write_Flag each have a value of "1," the slave 120 determines the RSA and WSA, reads out and transmits the R_Data1 recorded in the RSA to the master, and at the same time receives the W_Data1 from the master 110 and records the W_Data1 in the WSA. Additionally, the slave 120 reads out and transmits the R_Data2 recorded in the RSA+1 subsequent to RSA to the master 110, and simultaneously receives and records the W_Data2 in the WSA+1.

Accordingly, the slave 120 records the received R_Data byte by byte in the Read_Address which is sequentially increased based on the RSA while receiving the R_Data byte by byte. In addition, the slave 120 reads out the W_Data byte by byte in the Write_Address which increases sequentially based on the WSA, and transmits the W_Data to the master 110.

As a result, the master 110 receives the R_Data while transmitting the SDO bitwise on the falling edge of the SCLK. The slave 120 transmits the R_Data while receiving the SDO bitwise on the rising edge of the SCLK.

Figure 3:
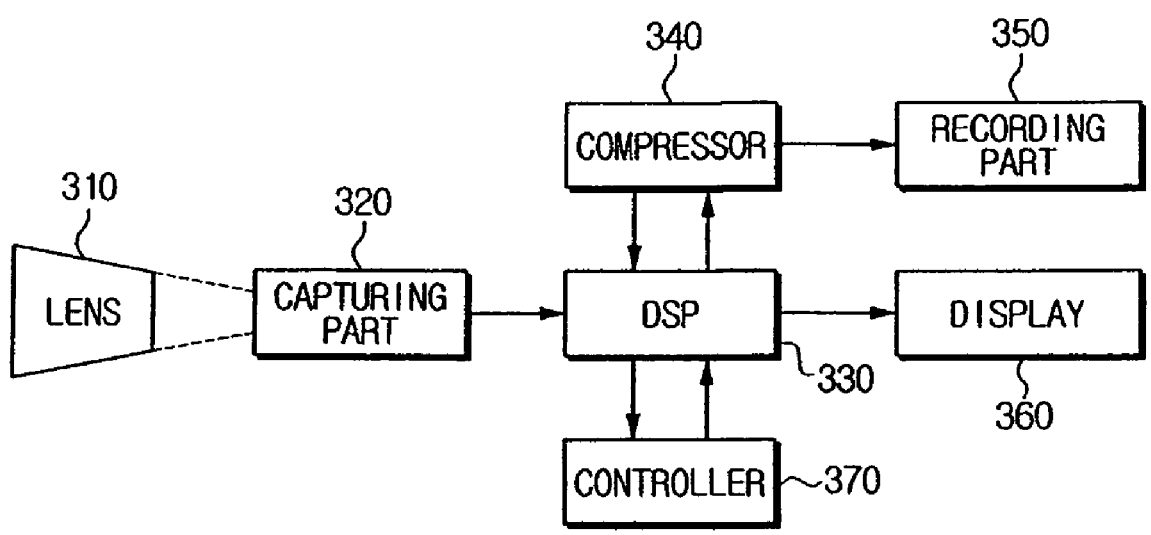
FIG. 3 is a block diagram of a digital camcorder applicable to an electronic apparatus according to an exemplary embodiment of the present general inventive concept.

Referring to FIGS. 1 through 3, an electronic apparatus including a device capable of simultaneously performing W_Data and R_Data functions is described in detail as an example. FIG. 3 is a block diagram of a digital camcorder employing the electronic apparatus according to an exemplary embodiment of the present general inventive concept. As illustrated in FIG. 3, the present digital camcorder includes a lens 310, a capturing part 320, a digital signal processor (DSP) 330, a compressor 340, a recording part 350, a display 360, and a controller 370.

An optical image signal formed through the lens 310 is applied to the capturing part 320, and is converted into a digital image signal. The digital signal is then transmitted to the DSP 330 and processed. The processed image signal may be output to the display 360, or may be compressed into a predetermined format by the compressor 340 to be stored in the recording part 350.

Specifically, if auto white balance (AWB) is performed, the controller 370 (e.g., the master 110) receives R_Data while transmitting the SDO containing the RSA, WSA, and W_Data. At this time, the RSA is an address of the DSP 330 in which information regarding color difference integration which is received first by the controller 370 is recorded. The WSA is an address of the DSP 330 in which information regarding the gain adjustment amount which is transmitted first to the DSP 330 by the controller 370 is recorded.

If it is determined that there is a command to perform writing and reading from the header while receiving the signal from the header of SDO, the DSP 330, that is the slave 120, reads out the color difference integration, that is the R_Data, byte by byte based on the RSA, and transmits the color difference integration to the master 110, and at the same time, receives the gain adjustment amount, that is the W_Data, and records the W_Data byte by byte based on the WSA. Therefore, the color difference integration and the gain adjustment amount are simultaneously transmitted in both directions between the controller 370 and the DSP 330, and thus, the controller 370 can reduce the time required to perform the AWB.

The electronic apparatus according to the exemplary embodiments of the present general inventive concept is employed in a digital camcorder, although it should not be construed to be limited to such a function. The electronic apparatus according to the exemplary embodiments of the present general inventive concept may be applied to all electronic apparatuses using serial peripheral interfaces.

In the electronic apparatus according to the exemplary embodiments of the present general inventive concept, reading and writing may be simultaneously performed, but only reading or only writing may be performed. If the Write_Flag is set to '0', only reading is performed, and if the Read_Flag is set to '0', only writing is performed.

As described above, according to the exemplary embodiments of the present general inventive concept, the device is provided which is capable of transmitting information containing a Read_Start_Address and a Write_Start_Address, and thus, the device may perform reading and writing simultaneously. Therefore, it is possible to reduce data communication time.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus, comprising:
   a first device to generate and output a Command containing a header and Write_Data, the header including a Read_Start_Address and a Write_Start_Address; and
   a second device to receive the Command to enable the data to be recorded.

2. The apparatus as claimed in claim 1, wherein the first device receives Read_Data from the second device while the Command is being transmitted to the second device.

3. The apparatus as claimed in claim 1, wherein the second device transmits Read_Data to the first device while the Command is being received from the first device.

4. The apparatus as claimed in claim 1, wherein the first and second devices are connected through a Serial Peripheral Interface (SPI), and the first device operates as a master and the second device operates as a slave.

5. The apparatus as claimed in claim 1, wherein a Write_Data1 corresponding to one byte of data transmitted first to the first device is recorded in the Write_Start_Address if the Write_Data comprises a plurality of bytes.

6. The apparatus as claimed in claim 5, wherein data other than the Write_Data1 is recorded byte by byte in addresses subsequent to the Write_Start_Address according to the transmission order.

7. A method of controlling an electronic apparatus comprising a first device and a second device, the method comprising:
generating a Command containing a header and Write_Data on the first device, the header including a Read_Start_Address and a Write_Start_Address; and
transmitting the Command from the first device to the second device.

8. The method as claimed in claim 7, wherein the first device receives Read_Data from the second device while the Command is being transmitted to the second device.

9. The method as claimed in claim 7, wherein the second device transmits Read_Data to the first device while the Command is being received from the first device.

10. The method as claimed in claim 7, wherein the first and second devices are connected through a Serial Peripheral Interface (SPI), and the first device operates as a master and the second device operates as a slave.

11. The method as claimed in claim 7, wherein a Write_Data1 corresponding to one byte of data transmitted first to the first device is recorded in the Write_Start_Address if the Write_Data comprises a plurality of bytes.

12. The method as claimed in claim 7, wherein data other than the Write_Data1 is recorded byte by byte in addresses subsequent to the Write_Start_Address according to the transmission order.

13. An electronic apparatus, comprising:
a slave to sequentially read data from a read start address and to transmit the read data in a bitwise manner; and
a master to generate a clock signal, to receive the read data from the slave and to transmit write data to the slave which records the write data sequentially from a write start address, the write data including a header which contains a write flag, a read flag, the write start address, and the read start address,
wherein the master transmits the write data and receives the read data simultaneously.

14. The electronic apparatus of claim 13, wherein the transmitting of the read data and the receiving of the write data occur at a rising edge of the clock signal.

15. The electronic apparatus of claim 13, wherein the reading and transmitting of the read data corresponds to the read flag, and the transmitting and recording of the write data corresponds to the write flag.

16. The electronic apparatus of claim 15, wherein the slave simultaneously reads and transmits the read data to the master while receiving and recording the write data when the values of the write flag, the write start address, the read flag, and the read start address are determined.

17. An electronic apparatus, comprising:
a master to generate a clock signal and to generate a command including write data and a header which includes a write flag, a write start address, a read flag, and a read start address; and
a slave to simultaneously read and transmit read data to the master while receiving and recording the write data from the master when the slave detects the values of the write flag, the write start address, the read flag, and the read start address.

18. A method of controlling an electronic apparatus comprising a first device and a second device, the method comprising:
generating a clock signal at the first device;
sequentially reading data from a read start address at the second device;
transmitting the read data in a bitwise manner to the first device; and
simultaneously receiving the read data at the first device and transmitting write data from the first device to the second device which records the write data sequentially from a write start address, the write data including a header which contains a write flag, a read flag, the write start address, and the read start address.

19. The method of claim 18, wherein the transmitting of the read data and the receiving of the write data occur at a rising edge of the clock signal.

* * * * *